United States Patent Office 3,296,660
Patented Jan. 10, 1967

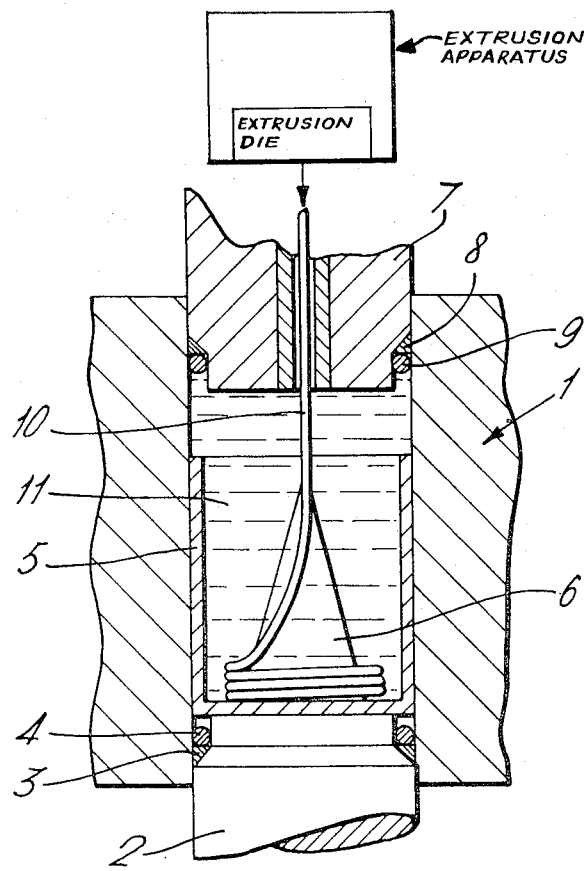

1

3,296,660
EXTRUSION APPARATUS
Derek Green, Lytham St. Annes, England, assignor to United Kingdom Atomic Energy Authority, London, England
Filed July 16, 1965, Ser. No. 472,628
Claims priority, application Great Britain, July 31, 1964, 30,279/64
2 Claims. (Cl. 18—12)

This invention relates to the extrusion of materials and especially (although not necessarily) to the extrusion of brittle materials.

Brittle materials are difficult to form by extrusion processes because of the surface cracking which occurs in the extruded material on emerging from the extrusion die into ambient atmospheric pressure. It has previously been found that such surface cracking can be eliminated or at least very materially reduced by subjecting the extruded material as it emerges from the die to high ambient fluid back pressures of, for example, above 100 tons per square inch. It is thought that the applied ambient fluid back pressure should be such as to exert a hydrostatic compressive force on the extruded material sufficient to neutralise the tensile stresses in the surface of the extruded material as it leaves the die—or at least to reduce such tensile stresses to a value lower than the ultimate stress of the material.

The above principle is applied in one manner by the provision of a pressure resistant chamber on the outlet side of the extrusion die. Extruded material emerging from the die enters the pressure resistant chamber which is filled with hydraulic liquid, the hydraulic liquid being pressurised to apply the necessary hydrostatic back pressure on the extruded material. In application of the above method in the extrusion of long slender articles, such as wire, the pressure resistant chamber containing hydraulic fluid for the application of hydrostatic back pressure on the extruded wire will have to be inconveniently long. Furthermore long narrow bore pressure resistant chambers are difficult and expensive to make.

According to the present invention a pressure-resistant chamber for receiving a wire formed by extrusion of material through a die into the pressure resistant chamber contains a guide surface inclined to the direction of extrusion of the wire so that the wire in contacting said guide surface is formed into a coil in the chamber.

In one form of the invention the guide surface is constituted by a conical member arranged on the axis of extrusion of the wire and having its apex pointing towards the extrusion die.

One form of the invention is shown by way of example in the sole figure of the accompanying drawings which shows the extrusion apparatus schematically and shows a sectional elevation of the pressure resistant chamber.

The figure shows the general arrangement of the invention wherein the extruded wire is delivered from an extrusion apparatus through an extrusion die to the pressure resistant chamber 1. It is apparent that to accomplish the stated purpose of the invention, that is to subject the extruded wire directly to the pressure chamber rather than to the ambient atmosphere, the entrance of the pressure chamber should be in sealed relationship with the exit face of the extrusion die.

The pressure resistant chamber 1 is closed at its lower end by a plug 2 which is sealed in the bore of the chamber 1 by a copper mitre ring 3 and a rubber O-ring seal 4. A cylindrical container 5 for receiving extruded material is mounted above the plug 2 in the chamber 1. A conical guide member 6 projects upwardly from the base of the container 5. A hollow plunger 7 is entered into the bore of the chamber 1 at its upper end. The plunger 7 is sealed in the bore of the chamber 1 by a copper mitre ring 8 and a rubber O-ring seal 9. Extruded wire 10 passes through the hollow plunger 7 into the chamber 1.

In use of the arrangement described above hydraulic liquid 11 is pressurised in the chamber 1 by means of the plunger 7 to apply a hydrostatic back pressure on the extruded wire 10 as it enters the chamber 1. The extruding wire 10 emerging through the plunger 7 into the chamber 1 is formed into a coil in the container 5 by contact with the conical guide member 6.

I claim:
1. Extrusion apparatus comprising an extrusion die having an exit face, means for extruding material through the extrusion die, a pressure resistant chamber having an entrance opening for receiving wire formed by extrusion of material through the die, said entrance opening being in sealed relationship with the exit face of the extrusion die, a fixed guide member within the pressure chamber, said guide member having a means inclined to the direction of extrusion of the wire for forming the wire which contacts the guide member into a coil in the chamber.

2. Extrusion apparatus as claimed in claim 1 wherein said means inclined to the direction of extrusion comprises a conical surface on said guide member, said surface arranged on the axis of extrusion of the wire and having its apex pointing towards the extrusion die.

References Cited by the Examiner
UNITED STATES PATENTS

| | | | |
|---|---|---|---|
| 1,370,800 | 3/1921 | Egerton. | |
| 2,023,665 | 12/1935 | Clayton | 18—12 X |
| 2,119,570 | 6/1938 | Brillhart | 18—13 |
| 2,371,709 | 3/1945 | Rineer | 18—12 |
| 2,516,065 | 7/1950 | McElligott | 264—40 |
| 2,627,083 | 2/1953 | Whitthoft | 18—13 X |
| 2,728,104 | 12/1955 | Fisch | 18—12 X |
| 2,948,919 | 8/1960 | Mathews | 18—1 |
| 3,151,355 | 10/1964 | Ramsey | 18—6 |
| 3,207,827 | 9/1965 | Kuehnle. | |

WILLIAM J. STEPHENSON, *Primary Examiner.*